(12) United States Patent
Bauer et al.

(10) Patent No.: US 7,489,127 B2
(45) Date of Patent: Feb. 10, 2009

(54) MEASURING SYSTEM FOR CONTACTLESS DETECTION OF A ROTARY ANGLE, WITH A MAGNETIC-FIELD-SENSITIVE ELEMENT DISPOSED IN A RECESS OF THE MAGNET

(75) Inventors: Bernhard Bauer, Althuette (DE); Matthias Zeh, Tamm (DE); Bernd Koeberle, Fellbach (DE); Thomas Klotzbuecher, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/054,567

(22) Filed: Mar. 25, 2008

(65) Prior Publication Data

US 2008/0238415 A1    Oct. 2, 2008

(30) Foreign Application Priority Data

Mar. 29, 2007    (DE) ...................... 10 2007 016 133

(51) Int. Cl.
*G01B 7/30*    (2006.01)

(52) U.S. Cl. ................................. 324/207.25; 324/174

(58) Field of Classification Search ......... 324/173–174, 324/207.2, 207.21, 207.25, 251; 73/514.31, 73/514.39; 338/32 R, 32 H
See application file for complete search history.

(56) References Cited

U.S. PATENT DOCUMENTS

| 6,483,296 | B1 * | 11/2002 | Hamaoka et al. | ....... 324/207.25 |
| 6,593,734 | B1 * | 7/2003 | Gandel et al. | ......... 324/207.25 |
| 6,756,780 | B2 * | 6/2004 | Hagio et al. | ........... 324/207.25 |

FOREIGN PATENT DOCUMENTS

| DE | 10 2004 047 784 A1 | 4/2006 |
| DE | 10 2005 013 442 A1 | 9/2006 |
| EP | 1 182 461 A2 | 2/2002 |
| EP | 1 364 650 A1 | 11/2003 |

* cited by examiner

*Primary Examiner*—Bot LeDynh
(74) *Attorney, Agent, or Firm*—Ronald E. Greigg

(57) ABSTRACT

The invention relates to a measuring system for contactless detection of a rotational angle, having a first body on which at least one magnet is disposed and having at least one magnetic-field-sensitive element, supported by a second body, for generating a measurement signal, the first body and the second body being rotatable counter to one another about an axis of rotation, and the magnet having a blind-borelike recess. The invention provides that the at least one magnetic-sensitive element protrudes at least partway into the recess.

20 Claims, 2 Drawing Sheets

MEASURING SYSTEM FOR CONTACTLESS DETECTION OF A ROTARY ANGLE, WITH A MAGNETIC-FIELD-SENSITIVE ELEMENT DISPOSED IN A RECESS OF THE MAGNET

REFERENCE TO FOREIGN PATENT APPLICATION

This application is based on German Patent Application No. 10 2007 016 133.8 filed 29 Mar. 2007, upon which priority is claimed.

BACKGROUND OF THE INVENTION

1. Field of the Invention

The invention relates to a measuring system for contactless detection of a rotational angle, having a first body on which at least one magnet is disposed and having at least one magnetic-field-sensitive element, supported by a second body, for generating a measurement signal, the first body and the second body being rotatable counter to one another about an axis of rotation, and the magnet having a blind-borelike recess.

2. Description of the Prior Art

A measuring system of the type with which this invention is concerned can be used in various systems in the automotive field in which rotational angles have to be measured, such as in a throttle valve transducer, an accelerator pedal value transducer in a pedal module, a vehicle body suspension transducer, or an angle encoder of a windshield wiper drive mechanism.

In such measuring systems, Hall elements are used above all as the magnetic-field-sensitive element. The Hall effect is in the category of galvanomagnetic effects and is evaluated above all by means of thin semiconductor chips. If this kind of semiconductor chip, with current flowing through it, is penetrated at a right angle by a magnetic field, then a voltage proportional to the magnetic field can be picked up transversely to the direction of the current. If silicon is the basic material, signal processing electronics can simultaneously be integrated with the semiconductor chip, making such sensors quite economical. Such integrated Hall ICs are predominantly suitable for measuring angles and distances travelled by detecting the fluctuating field intensity of the magnet that is connected to a moving rotor.

One sensor with such Hall elements is known from European Patent Disclosure EP 1 182 461 A2, for instance; in it, a magnetic field concentrator varies the course in its vicinity of the field lines of the magnet field generated by the magnet and causes the field lines, which in the absence of magnetic field concentrator would extend parallel to the surface of the Hall elements, to penetrate the Hall elements at virtually a right angle to their surface. Hall elements diametrically facing one another each form a pair for generating an output signal, whose intensity depends on the direction of the magnetic field, which in turn is defined by the instantaneous location of the magnet; the magnet is connected in a manner fixed against relative rotation to a rotor, for instance, of an electric motor, and thus on the basis of the output signal, the rotational angle of the rotor can be determined.

Such Hall elements, to make their resolution high enough, require an adequate magnetic field intensity. A high magnetic field intensity also has a favorable effect with regard to extraneous fields and unavoidable ageing. Moreover, these sensors require a homogeneous magnetic angular range so that tolerances for new parts or tolerances that occur in operation, such as shifts in the axis of rotation from wear or mechanical play, can be compensated for. The magnets used in such applications are therefore relatively large.

Some applications, for instance as a rotational angle transducer in accelerator pedal modules, have an adjustment range of from 10. to 30° of angular rotation. In such applications, even small errors, in the range of from 0.1° to 0.3°, cause relatively major changes of voltage in the output signal in the electronics.

A measuring system of this generic kind is know from German Patent Disclosure DE 10 2005 013 442 A1 and is used in an accelerator pedal module. It includes two magnetic disks, located symmetrically to a center axis, each with a blind-borelike recess, between which the magnetic-field-sensitive element is disposed with a relatively large axial air gap. The magnetic field intensity, however, decreases with the distance of the magnetic-field-sensitive element from the magnet. Relatively large magnets are therefore necessary, so as to furnish a sufficient magnetic field intensity and homogeneity for a linear output signal of the magnetic-field-sensitive element.

OBJECT AND SUMMARY OF THE INVENTION

The invention is based on the concept that the magnetic-sensitive element protrudes at least partway into the blind-borelike recess of the magnet. As a result, the magnetic-field-sensitive element is in an embedded position in the magnet and is thus reached by a range of the magnetic field where this field is homogeneous and the magnetic field lines occur in concentrated form. Consequently, with a relatively small magnet, a relatively strong, homogeneous magnetic field can be generated, which has a favorable effect on the resolution and linearity of the measurement signal. As a result, the influence of extraneous fields and tolerances is reduced as well.

In a preferred embodiment, the magnet is held on the rotor via a magnet holder that is supported rotatably on the stator by a guide. As a result, the magnet is centered relative to the magnetic-field-sensitive element and vice versa, so that any existing play in the rotary bearing action of the rotor can be compensated for. This improved guidance provides for an advantageous increase in measurement precision.

For example, the guide may include at least two guide columns, protruding away from the magnet holder in the direction of the magnetic-field-sensitive element, between which guide columns the magnetic-field-sensitive element is disposed; the guide columns are guided in circular-arclike slots of the stator.

In a further provision, the magnetic-field-sensitive element has a spacing from a bottom of the recess of the magnet that is so small that the magnetic-field-sensitive element is just barely not in contact with this bottom. This provides for further improvement in the position of the magnetic-field-sensitive element relative to the magnet, since a spacing that is as slight as possible yet without causing a magnetic short circuit ensures even better flooding of the magnetic-field-sensitive element by the magnetic field.

Last but not least, the magnet is disklike and magnetized or polarized in sectors on the surface pointing toward the magnetic-field-sensitive element. The edges of the recess in the magnet are then polarized oppositely, as a result of which the field lines of the magnetic field occur in concentrated form in the region of the recess and extend approximately parallel to the bottom of the recess and hence also parallel to he magnetic-field-sensitive element. If this latter element is formed by a Hall element, then it preferably has a magnetic field concentrator. This is because Hall elements are sensitive to the component of the magnetic field B that strikes their surface at a right angle, as has already been discussed at the outset. The magnetic field concentrator varies the course in its vicinity of the field lines of the magnetic field B and causes the field lines, which in the absence of the magnetic field concentrator would extend parallel to the surface of the Hall element, to penetrate the Hall element virtually perpendicular to its surface, that is, in a direction in which this element is sensitive. In this way, the magnetic-field-sensitive element is optimally reached by the field lines of the magnetic field, which leads to further improvement in the resolution and a further enhancement of measurement precision.

The precise structure of the measuring system will become clear from the ensuing description of an exemplary embodiment.

BRIEF DESCRIPTION OF THE DRAWINGS

The invention will be better understood and further objects and advantages thereof will become more apparent from the ensuing detailed description of a preferred embodiment, taken in conjunction with the drawings, in which.

DESCRIPTION OF THE PREFERRED EMBODIMENT

Figure 1:
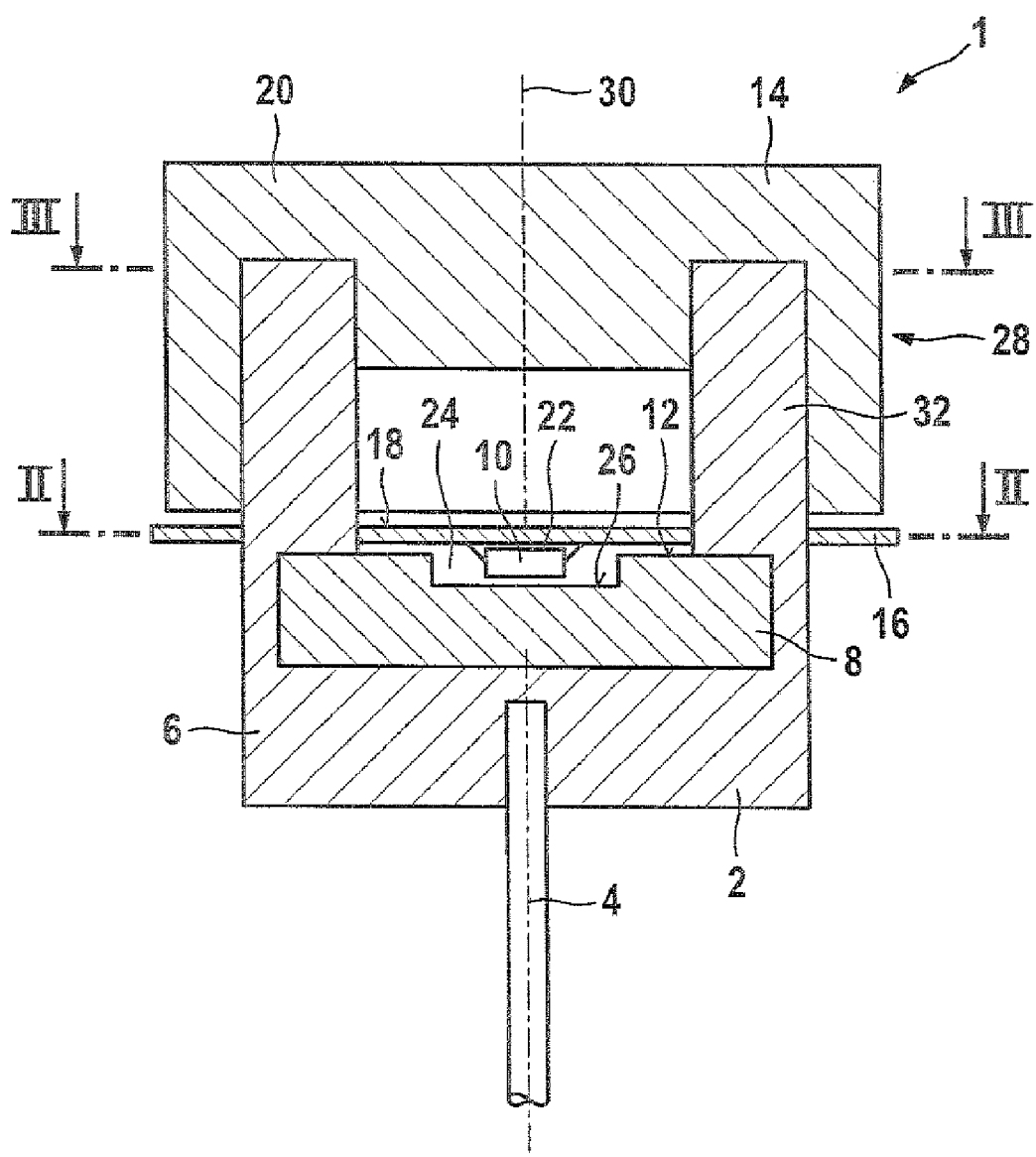
FIG. 1 is a schematic cross-sectional view of a measuring system in a preferred embodiment of the invention.

The preferred exemplary embodiment of a measuring system 1, shown in FIG. 1, for contactless detection of a rotational angle is used for instance to measure the actuation angle of an electronic accelerator pedal, not shown for reasons of scale, of an accelerator pedal module. Furthermore, a measuring system 1 of this kind can be used in various systems in the automotive field in which rotational angles have to be measured, such as in a throttle valve transducer, an accelerator pedal value transducer in a pedal module, a vehicle body suspension transducer, or an angle encoder of a windshield wiper drive mechanism.

The measuring system 1 includes a rotor 2, such as a disklike magnet holder 6 that is rotatable about an axis of rotation 4 and that is connected in a manner fixed against relative rotation to an accelerator pedal supported rotatably relative to a bearing block, and embedded in the magnet holder is a radially outer edge of a magnet 8, for instance of disklike shape, and this is done for instance by injecting the magnet 8 partway into the disklike magnet holder 6, made from a plastic blank. In the process, a surface 12, pointing to at least one magnetic-field-sensitive element 10, of a radially inner part of the magnet 8 is left free. The magnet 8 is preferably a permanent magnet.

A stator 14 is also present, which is connected to the bearing block of the accelerator pedal, and which carries the magnetic-field-sensitive element 10 for generating a measurement signal, the magnetic-field-sensitive element for instance being a field plate, a magnet transistor, a coil, a magnetoresistive element, or a Hall element. On the side pointing toward the magnet 8, the magnetic-field-sensitive element 10 is supported by a circuit board 16 that is secured to a bottom 18 of a housing 20 of the stator 14.

In the present case, preferably one or more interconnected Hall elements are used as the magnetic-field-sensitive elements 10 and are preferably integrated into a silicon semiconductor chip 22 that is secured to the circuit board 16 and in which signal processing electronics are realized. The semiconductor chip 22 includes at least one magnetic field concentrator. The Hall elements 10 are sensitive to the component of the magnetic field B that strikes their surface at a right angle, as has already been discussed at the outset. The magnetic field concentrator varies the course in its vicinity of the field lines of the magnetic field B generated by the permanent magnet 8, and causes the field lines, which in the absence of the magnetic field concentrator would extend parallel to the surface of the Hall elements 10, to penetrate the Hall elements 10 at virtually a right angle to their surface, or in other words in a direction in which these elements are sensitive.

The magnet 8 is disklike for instance and has a recess 24 of blind-borelike, for instance circular, shape, with a bottom 26. Alternatively, the recess 24 could have an arbitrary cross section and in particular could even be rectangular. The semiconductor chip 22, with e magnetic-sensitive elements 11, protrudes at least partway into the blind-borelike recess 24 in the magnet 8. In the present case, the semiconductor chip 22 is located almost entirely in this recess 24; only a slight portion of it protrudes past the surface 12 of the magnet 8. As a result, the magnetic-field-sensitive elements 10 are in an embedded position in the magnet 8 and are thus reached by a region of the magnetic field B where this field is homogeneous and the magnetic field lines occur in concentrated form.

Figure 2:
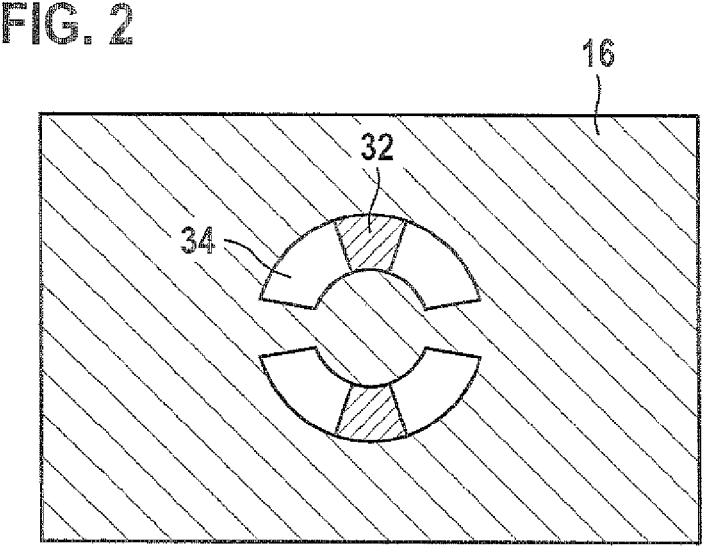
FIG. 2 is a cross-sectional view along the line II-II of FIG. 1.
Figure 3:
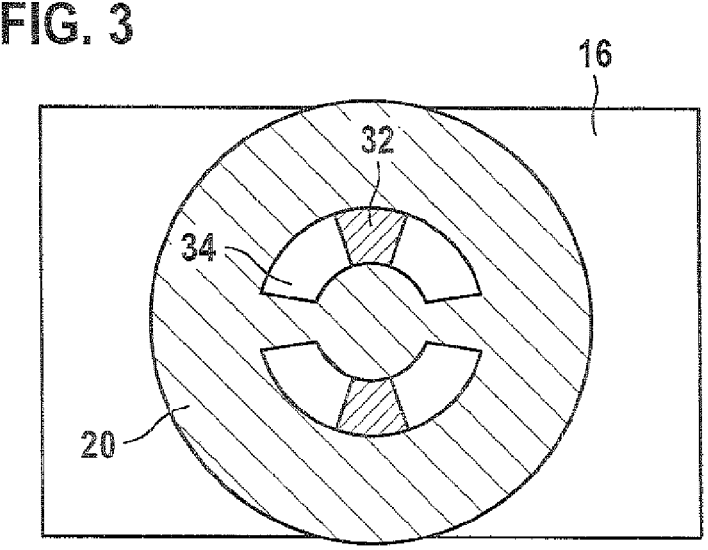
FIG. 3 is a cross-sectional view along the line III-III of FIG. 1.

In a preferred embodiment, the disklike magnet holder 6 that holds the magnet 8 is rotatably supported not only by the shaft defining the axis of rotation 4 but also by a guide 28 facing it on the housing 20 of the stator 14. The disklike magnet holder 6 and the housing 20, which for instance is cylindrical, are coaxial to one another and to a center axis 30. The guide 28 can for instance include at least two guide columns 32, protruding away from the radially outer edge of the magnet holder 6 in the direction of the magnetic-field-sensitive elements 10 or in the direction of the housing 20, the magnetic-field-sensitive elements 10 being located between these guide columns, and the guide columns 32 are guided in circular-arclike guide slots 34 embodied in the housing 20, as shown in FIGS. 2 and 3.

The semiconductor chip 22 with the magnetic-field-sensitive elements 10 also has a spacing from the bottom 26 of the recess 24 of the magnet 8 that is so slight that the magnetic-field-sensitive elements 10 are just barely not in contact with this bottom 26. This provision ensures an improvement in the position of the magnetic-field-sensitive elements 10 relative to the magnet 8, since a spacing that is as small as possible without generating a magnetic short circuit ensures better flooding of the magnetic-field-sensitive elements 10 by the magnetic field B.

Figure 4:
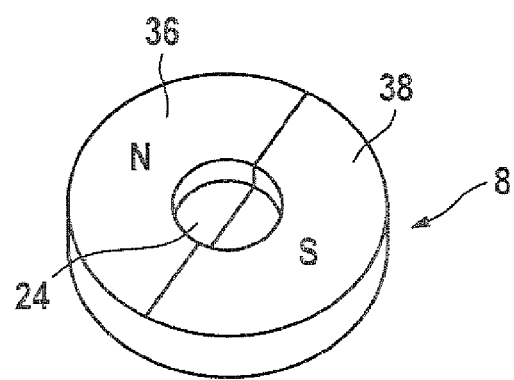
FIG. 4 is a perspective view of a magnet of the kind used in the measuring system in FIG. 1.

Last but not least, the magnet 8 is magnetized or polarized in sectors, on the surface 12 pointing toward the magnetic-field-sensitive elements 10, as seen in FIG. 4. This kind of sectorlike polarization or magnetization is understood to mean different polarities of the various sectors 36, 38 of the disklike magnet 8, so that the polarity varies in the circumferential direction from sector 36 to sector 38.

In the present case, only two sectors 36, 38 are provided, which have different polarity at the north pole and south pole. Alternatively, more than two sectors of different polarity could also be present. In the preferred exemplary embodiment, the semicircularly extending edges of the recess 24 of the magnet 8 are in particular oppositely polarized, and as a result the field lines of the magnetic field B occur in concentrated form in the region of the recess 24 and extend approximately parallel to the bottom 26 of the recess and thus also parallel to the magnetic-field-sensitive elements 10. The magnetic field concentrator associated with the magnetic-field-sensitive elements 10 then ensures a deflection of the magnetic field lines perpendicular to its surface, or in other words in a direction in which they react sensitively to he magnetic field B, as has already been discussed at the outset.

Alternatively, the magnet 8 could also be magnetized or polarized axially. For the present case of a disklike magnet 8, this means that the dividing plane between the north pole N and the south pole S is approximately coplanar with the center plane, extending perpendicular to the center axis 30, of the magnet 8.

The magnetic-field-sensitive elements 10 then detect the field intensity or field direction of the magnetic field B, these being dependent on the rotary position, of the permanent magnet 8 connected to the accelerator pedal in a manner fixed against relative rotation, so that on the basis of the output signal of the magnetic-field-sensitive elements 10, the instantaneous rotational angle of the permanent magnet 8 can be determined with the aid of the signal processing electronics. Since the permanent magnet 8 is connected to the accelerator pedal in a manner fixed against relative rotation, the rotational angle position of the magnetic-field-sensitive elements 10 can be detected from their output signal. The mode of operation and interconnection of Hall elements as magnetic-field-sensitive elements with a magnetic field concentrator is adequately described, for instance in European Patent Disclosure EP 1 182 461 A2. and US Patent Disclosure 2002/0021124 A1, and will therefore not be discussed in further detail here.

The measuring system 1 serves to detect a rotation of two bodies relative to one another. The measuring system 1 may be embodied in such a way that the first body 2, with the magnet 8, forms the rotatable rotor of the measuring system 1, and the second body 14 with the magnetic-sensitive element 10 forms the fixed stator of the measuring system 1. However, the measuring system 1 may also be embodied such that the first body 2 with the magnet 8 is fixed and thus can be called the stator of the measuring system 1, while the second body 14 with the magnetic-sensitive element 10 is rotatable and can be called the rotor of the measuring system 1.

The foregoing relates to a preferred exemplary embodiment of the invention, it being understood that other variants and embodiments thereof are possible within the spirit and scope of the invention, the latter being defined by the appended claims.

We claim:

1. A measuring system for contactless detection of a rotational angle, the system comprising a first body, at least one magnet disposed on the first body, a second body, at least one magnetic-field-sensitive element supported by the second body for generating a measurement signal, means supporting the first body and the second body for rotation counter to one another about an axis of rotation, and a blind-borelike recess in the magnet, the at least one magnetic-sensitive element protruding at least partway into the recess.

2. The measuring system as defined by claim 1, wherein the first body is a rotor, and the second body is a stator.

3. The measuring system as defined by claim 1, wherein the first body is a stator, and the second body is a rotor.

4. The measuring system as defined by claim 2, wherein the magnet is held on the rotor via a magnet holder that is rotatably supported on the stator by a guide.

5. The measuring system as defined by claim 4, wherein the guide comprises at least two guide columns, protruding away from the magnet holder in the direction of the magnetic-field-sensitive element, between which guide columns the magnetic-field-sensitive element is disposed.

6. The measuring system as defined by claim 5, wherein the guide columns are guided in circular-arclike guide slots of the stator.

7. The measuring system as defined by claim 1, wherein the magnet is embodied in disklike fashion.

8. The measuring system as defined by claim 1, wherein the magnet is magnetized or polarized in sectors on the surface pointing toward the magnetic-field-sensitive element.

9. The measuring system as defined by claim 2, wherein the magnet is magnetized or polarized in sectors on the surface pointing toward the magnetic-field-sensitive element.

10. The measuring system as defined by claim 4, wherein the magnet is magnetized or polarized in sectors on the surface pointing toward the magnetic-field-sensitive element.

11. The measuring system as defined by claim 5, wherein the magnet is magnetized or polarized in sectors on the surface pointing toward the magnetic-field-sensitive element.

12. The measuring system as defined by claim 6, wherein the magnet is magnetized or polarized in sectors on the surface pointing toward the magnetic-field-sensitive element.

13. The measuring system as defined by claim 7, wherein the magnet is magnetized or polarized in sectors on the surface pointing toward the magnetic-field-sensitive element.

14. The measuring system as defined by claim 1, wherein the magnetic-field-sensitive element has a spacing from a bottom of the recess of the magnet that is so small that the magnetic-field-sensitive element is just barely not in contact with this bottom.

15. The measuring system as defined by claim 2, wherein the magnetic-field-sensitive element has a spacing from a bottom of the recess of the magnet that is so small that the magnetic-field-sensitive element is just barely not in contact with this bottom.

16. The measuring system as defined by claim 4, wherein the magnetic-field-sensitive element has a spacing from a bottom of the recess of the magnet that is so small that the magnetic-field-sensitive element is just barely not in contact with this bottom.

17. The measuring system as defined by claim 5, wherein the magnetic-field-sensitive element has a spacing from a bottom of the recess of the magnet that is so small that the magnetic-field-sensitive element is just barely not in contact with this bottom.

18. The measuring system as defined by claim 6, wherein the magnetic-field-sensitive element has a spacing from a bottom of the recess of the magnet that is so small that the magnetic-field-sensitive element is just barely not in contact with this bottom.

19. The measuring system as defined by claim 7, wherein the magnetic-field-sensitive element has a spacing from a bottom of the recess of the magnet that is so small that the magnetic-field-sensitive element is just barely not in contact with this bottom.

20. The measuring system as defined by claim 8, wherein the magnetic-field-sensitive element has a spacing from a bottom of the recess of the magnet that is so small that the magnetic-field-sensitive element is just barely not in contact with this bottom.

* * * * *